United States Patent [19]

Tsukamoto et al.

[11] Patent Number: 5,361,965
[45] Date of Patent: Nov. 8, 1994

[54] SECONDARY COIL PLATE FOR LINEAR MOTOR AND PRODUCING METHOD OF THE SAME

[75] Inventors: Yukimaro Tsukamoto, Konan; Yasuo Ido, Komaki; Susumu Tuzi, Kani; Takashi Inaba, Kakamigahara, all of Japan

[73] Assignee: Daido Metal Company, Ltd., Nagoya, Japan

[21] Appl. No.: 137,922

[22] Filed: Oct. 19, 1993

[30] Foreign Application Priority Data

Jan. 4, 1993 [JP] Japan .................................. 5-000063

[51] Int. Cl.⁵ ............................................. B23K 20/04
[52] U.S. Cl. ................................... 228/117; 428/653; 228/189; 228/231; 228/235.2; 228/262.44
[58] Field of Search ................... 228/189, 235.2, 235.3, 228/262.44, 117; 428/652, 653, 677

[56] References Cited

U.S. PATENT DOCUMENTS

| | | | |
|---|---|---|---|
| 3,050,834 | 8/1962 | Ulam | 428/677 |
| 3,064,112 | 11/1962 | Hanzel | 428/652 X |
| 3,381,366 | 5/1968 | Winter | 228/235.3 X |
| 3,470,607 | 10/1969 | Rader et al. | 428/652 X |
| 3,912,152 | 10/1975 | Forand | 228/235.3 |
| 3,952,938 | 4/1976 | Ulam | 228/235.3 X |
| 4,004,892 | 1/1976 | Ulam | 428/677 |

FOREIGN PATENT DOCUMENTS 1046788 10/1966 United Kingdom .
1488984 10/1977 United Kingdom .

*Primary Examiner*—Kenneth J. Ramsey
*Attorney, Agent, or Firm*—Browdy and Neimark

[57] ABSTRACT

A secondary coil for a linear motor, which is a composite metal plate comprising a backing metal layer 1, an intermediate bond metal layer 2 and a surface metal layer 3 which are integrally connected, the intermediate bond metal layer being formed of aluminum or aluminum alloy, the surface metal layer being formed of copper or copper alloy having a thickness of 2 to 8 mm. A copper plate or a copper alloy plate for the surface layer and an aluminum plate or an aluminum alloy plate for the intermediate layer are placed on each other and connected by rolling. The surface-layer metal plate with the bond layer is placed on a metal plate for the backing metal layer, with the bond layer being contacted with the metal plate for the backing metal layer, and two plates are connected by rolling.

3 Claims, 1 Drawing Sheet

MAGNIFICATION (×120)

SECONDARY COIL PLATE FOR LINEAR MOTOR AND PRODUCING METHOD OF THE SAME

FIELD OF THE INVENTION

The present invention relates to a composite metal plate used as a secondary coil plate for a linear motor and a method of producing the same.

BACKGROUND OF THE INVENTION

Recently, track traveling vehicles with linear motors as an urban transportation system have been in the spotlight. A linear motor is a motor which effects linear movement instead of rotational movement by linearly extending a structure of a rotary-type motor. In the case of a linear motor car, a magnetic field is produced by supplying alternating current to a primary coil mounted on the car side, and a force is generated due to an interaction between this magnetic field and a magnetic field produced on a secondary coil (reaction plate) mounted on the track side. This force is utilized as a motive force. Thus, a driving force of the linear motor car is obtained.

The reaction plate is required to have a property of low electric resistance as an essential condition. In this relation, copper or copper alloy is suitable for a reaction plate material. However, if copper or copper alloy is used alone, the cost is too high, and the strength is insufficient. These are the reasons why a reaction plate composed of a copper or copper alloy material and a steel material of high strength is used generally. This composite structure is obtained by hot rolling bonding (hot bonding) in which a copper plate or a copper alloy plate and a steel plate are placed on each other and rolled, or by explosive bonding.

The conventional manufacturing method of the composite material involves the following disadvantages: (1) special equipments and devices are required for hot bonding or explosive bonding thereby raising the manufacturing cost; (2) hot bonding demands a high reduction; and (3) smoothness of the surface of products by explosive bonding is inferior so that cutting work of the surface is necessary.

SUMMARY OF THE INVENTION

The present invention has been achieved in taking account of the above-described technical background. An objective of the invention resides in overcoming various kinds of disadvantageous conditions of the conventional technique in manufacture of a reaction plate, i.e., a secondary coil plate for a linear motor.

According to the present invention to achieve the objective, there are provided a secondary coil plate for a linear motor and a method of producing the same as follows:

1) A secondary coil plate for a linear motor, which is a composite metal plate comprising a backing metal layer, an intermediate bond metal layer and a surface metal layer which are integrally connected, the intermediate bond metal layer being formed of a aluminum or aluminum alloy, the surface metal layer being formed of copper or copper alloy having a thickness of 2 to 8 mm.

2) A method of manufacturing a secondary coil plate for a linear motor, which is a composite metal plate comprising a backing metal layer, an intermediate bond metal layer and a surface metal layer which are integrally connected, comprising the steps of:

a) placing a copper plate or a copper alloy plate for the surface layer and an aluminum plate or an aluminum alloy plate for the intermediate layer on each other, and bonding these two plates integrally by rolling, to obtain a surface-layer metal plate with a bond layer;

b) placing the surface-layer metal plate with the bond layer thus obtained on a metal plate for the backing metal layer, with the bond layer being contacted with the metal plate for the backing metal layer, and bonding the two plates integrally by rolling, to obtain the composite metal plate comprising the backing metal layer, the intermediate bond metal layer and the surface metal layer having a thickness of 2 to 8 mm, which are integrally connected; and c) subjecting the composite metal plate thus obtained to heattreatment.

The secondary coil plate for a linear motors i.e., the reaction plate, according to the present invention includes the intermediate bond layer interposed between the backing metal layer and the surface metal layer, which intermediate bond layer is made of a aluminum or aluminum alloy and has a favorable bonding property. Therefore, bonding of the metal plates can be performed by coil rolling (rolling at a room temperature).

DETAILED DESCRIPTION OF THE PREFERRED EMBODIMENTS

Figure 1:
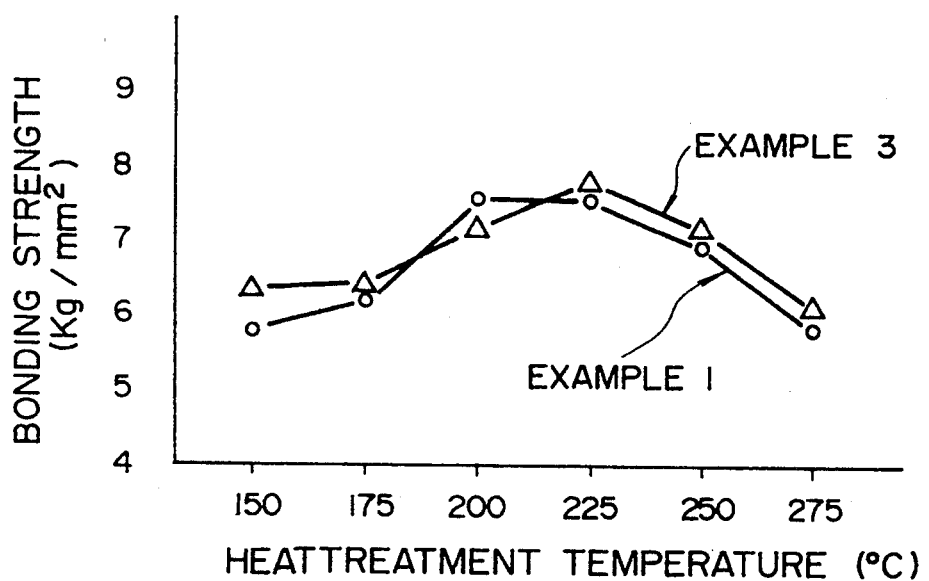
FIG. 1 is a graph showing bonding strength between a backing metal layer and a surface metal layer.

The present invention will be hereinafter described in detail on the basis of the preferred embodiments.

EXAMPLE 1 a) A copper plate (JIS C1020) having a thickness of 12 mm, a width of 200 mm and a length of 2000 mm was degreased. After that, one surface of the copper plate was ground by a brush of wire having a diameter of 0.3 mm.

b) An aluminum sheet (JIS A1050) having a thickness of 0.8 mm, a width of 198 mm and a length of 2000 mm was degreased. After that, one surface of the aluminum sheet was ground by a brush of wire having a diameter of 0.3 mm. This ground surface was placed on the ground surface of the copper plate, and subjected to cold rolling by a rolling machine, thereby obtaining a copper plate with an intermediate bond aluminum layer which had a thickness of 6.2 mm. It was cut to have substantially the same length as a backing metal material. After degreased, the aluminum layer bonded surface was ground by a brush of wire having a diameter of 0.3 mm.

c) A steel plate (JIS S15C) having a thickness of 19 mm, a width of 150 mm and a length of 2000 mm as the backing metal material was degreased. After that, one surface of the steel plate was ground by a sand belt of 36#. The ground surface of this steel plate was placed on the aluminum layer bonded surface of the copper plate with the intermediate bond aluminum layer, and subjected to cold rolling by a rolling machine, thereby obtaining a composite metal plate. Then, the composite metal plate was subjected to a heattreatment at a temperature of 200° C. for four and a half hours. Thus, an invention plate No. 1 was obtained. The overall thickness of the invention plate was 22.6 mm, and the thickness of the surface metal layer was 5.4 mm (reduction: 10.3%).

EXAMPLE 2 a) A copper plate and an aluminum sheet which had the same dimensions as those of Example 1 were used and processed into a copper plate with an intermediate bond aluminum layer which had a thickness of 6.2 mm my the same method as Example 1. After it was cut to have substantially the same length as a steel plate as a backing metal material, it was subjected to a heat treatment at a temperature of 350° C for four and a half hours. After it was cooled down to a room temperature, the surface of the aluminum layer was ground by a brush of wire having a diameter of 0.3 mm.

b) A steel plate (JIS SS400) having a thickness of 22 mm, a width of 150 mm and a length of 2000 mm as the backing metal material was degreased. After that, one surface of the steel plate was ground by a sand belt of 36#. The ground surface of this steel plate was placed on the aluminum layer bonded surface of the copper plate with the intermediate bond aluminum layer, and subjected to cold rolling by a rolling machine, thereby obtaining a composite metal plate. Then, the composite metal plate was subjected to a heattreatment at a temperature of 200° C. for six and a half hours. Thus, an invention plate No. 2 was obtained. The overall thickness of the invention plate was 22.6 mm, and the thickness of the surface metal layer was 5.0 mm (reduction: 25.5%).

EXAMPLE 3

Figure 2:
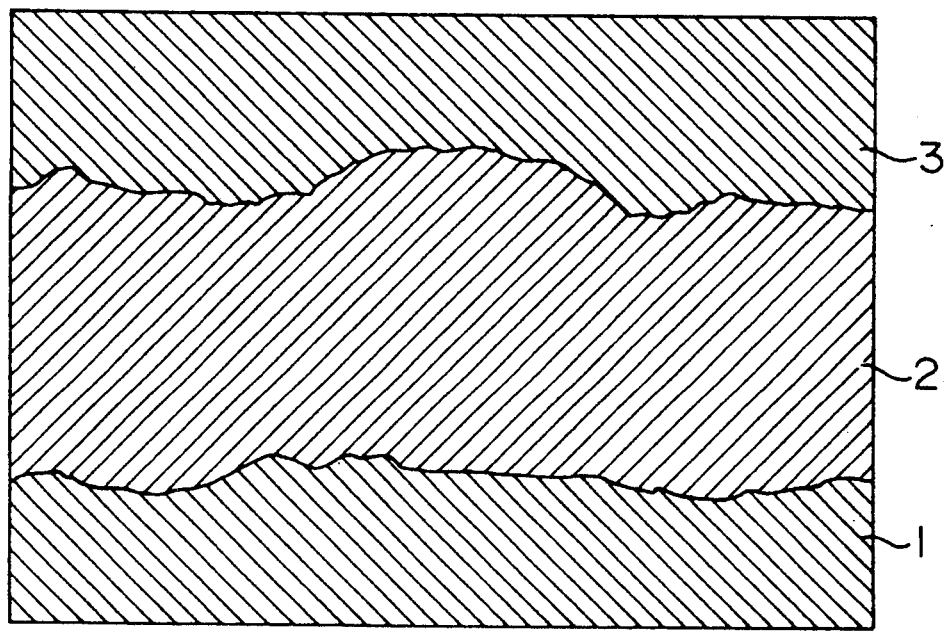
FIG. 2 is a diagram showing typical lamination structure of a composite metal plate according to the invention, which was observed by a microscope.

A composite metal plate was obtained under the same conditions as Example 1 except for the fact that an aluminum alloy containing, by weight, 0.5% Si and 0.6% Mg was used for an intermediate bond metal layer. Bonding strength between the surface metal layer and the backing metal layer, and an influence of the heattreatment temperature in each of the examples obtained in the above-described manners are shown in FIG. 1. A typical lamination structure of a composite metal material which was observed by a microscope is shown in FIG. 2. In FIG. 2, reference numeral 1 denotes a backing steel layer, 2 denotes an intermediate bond aluminum layer, and 3 denotes a surface copper layer. The bonding strength was measured at a room temperature after the heattreatment.

As the surface metal layer, use of JIS C1020, C1100, C1201, C1220 and C1221, which are copper alloys of high conductivity, is recommended. Moreover, an aluminum alloy of a composition containing 0.]to 2 weight %, in total, one or more of Cu, Si, Mn, Zn and Mg can be employed for the intermediate bond metal layer.

The present invention has the following technical advantages: (1) Cold rolling bonding of each of the metal layers of the composite metal plate serving as a secondary coil plate for a linear motor can be performed with a low reduction. Therefore, the product has no distortion, and its surface is smooth, so that grinding work is not necessary.

(2) It is different from the conventional manufacturing method of composite metal plates by hot bonding or explosive bonding in the point that particular equipments are not required, so that the working environment can be improved and reduction of the manufacturing costs can be achieved.

What is claimed is:

1. A secondary coil plate for a linear motor, which is a composite metal plate comprising a backing metal layer, an intermediate bond metal layer and a surface metal layer which are integrally connected, said intermediate bond metal layer being formed of aluminum or aluminum alloy, said surface metal layer being formed of copper or copper alloy having a thickness of 2 to 8 mm.

2. A method of manufacturing a secondary coil plate for a linear motor, which is a composite metal plate comprising a backing metal layer, an intermediate bond metal layer and a surface metal layer which are integrally connected, comprising the steps of:

a) placing a copper plate or a copper alloy plate for the surface layer and an aluminum or aluminum alloy plate for the intermediate layer on each other, and bonding these two plates integrally by rolling, to obtain a surface-layer metal plate with a bond layer;

b) placing the surface-layer metal plate with the bond layer thus obtained on a metal plate for the backing metal layer, with the bond layer being contacted with the metal plate for the backing metal layer, and bonding these two plates integrally by rolling, to obtain the composite metal plate comprising the backing metal layer, the intermediate bond metal layer and the surface metal layer having a thickness of 2 to 8 mm, which are integrally connected; and c) subjecting the composite metal plate thus obtained to a heat treatment.

3. A secondary coil plate for a linear motor made by the method of claim 2.

\* \* \* \* \*